US012685984B2

(12) United States Patent
Shi et al.

(10) Patent No.: US 12,685,984 B2
(45) Date of Patent: Jul. 21, 2026

(54) COLLOIDOSOME WITH VARIABLE PORE SIZE AND PREPARATION METHOD THEREOF

(71) Applicant: CHINA ACADEMY OF SAFETY SCIENCE AND TECHNOLOGY, Beijing (CN)

(72) Inventors: Congling Shi, Beijing (CN); Jingyun Jing, Beijing (CN); Guolin Liu, Beijing (CN); Xiaodong Qian, Beijing (CN); Fei Ren, Beijing (CN); Junyi Li, Beijing (CN)

(73) Assignee: CHINA ACADEMY OF SAFETY SCIENCE AND TECHNOLOGY, Beijing (CN)

( * ) Notice: Subject to any disclaimer, the term of this patent is extended or adjusted under 35 U.S.C. 154(b) by 183 days.

(21) Appl. No.: 18/395,759

(22) Filed: Dec. 26, 2023

(65) Prior Publication Data

US 2024/0216886 A1 Jul. 4, 2024

(30) Foreign Application Priority Data

Dec. 28, 2022 (CN) .......................... 202211692831.0

(51) Int. Cl.
| | |
|---|---|
| *B01J 13/18* | (2006.01) |
| *B01J 13/20* | (2006.01) |
| *C08F 112/12* | (2006.01) |
| *C08K 9/06* | (2006.01) |

(52) U.S. Cl.
CPC ............. *B01J 13/18* (2013.01); *B01J 13/203* (2013.01); *C08F 112/12* (2013.01); *C08K 9/06* (2013.01); *C08K 2201/005* (2013.01); *C08K 2201/01* (2013.01); *C08K 2201/011* (2013.01)

(58) Field of Classification Search
None
See application file for complete search history.

(56) References Cited

U.S. PATENT DOCUMENTS

2022/0257511 A1* 8/2022 Malik .................... A61K 9/127

FOREIGN PATENT DOCUMENTS

CN 104477990 A 4/2015

OTHER PUBLICATIONS

Hexagonal Close-Packed structure; 2012 Science Direct (Year: 2012).*
Nan, Fangfang; Preparation of Uniform-Sized colloidosome based on chitosan-coated alginate particles and its application for oral insulin delivery 2014, Journals of Material Chemistry B (Year: 2014).*

* cited by examiner

*Primary Examiner* — Farah Taufiq
(74) *Attorney, Agent, or Firm* — Bayramoglu Law Offices LLC

(57) ABSTRACT

A colloidosome with a variable pore size and a preparation method thereof are provided. The preparation method includes the steps of modification of nanoparticles, preparation of amphiphilic nanoparticles, preparation of a colloidosome with a variable pore size and the like. Through specific setting of each step, the finally prepared colloidosome is stable and has a variable pore size, and a hydrophobic polymer chain in a cavity of the colloidosome has corresponding contraction and extension forms in different medium environments, such as water and oil, to block or expose pores, so as to meet application requirements for transmission in selective media.

16 Claims, 2 Drawing Sheets

COLLOIDOSOME WITH VARIABLE PORE SIZE AND PREPARATION METHOD THEREOF

TECHNICAL FIELD

The present invention relates to the technical field of colloid materials, and specifically relates to a colloidosome with a variable pore size and a preparation method therefor.

BACKGROUND

Colloidosomes refer to microcapsules composed of colloid particles as structural elements. As special materials with hollow structures, the colloidosomes have porous shells and functional structural elements, and the colloidosomes have a wide application prospect in a variety of fields, such as biomedicine, cell transplantation, functional food and the petroleum industry.

A soft template method is a common method for preparing the colloidosomes at present. The colloidosomes are mainly prepared by self-assembly and crosslinking of colloid particles on surfaces of emulsion drops, and the soft template method has a simple preparation process. However, the soft template method has the disadvantages that the shape, size and uniformity of the prepared colloidosomes are difficult to control, and that introduction of functional materials into cavities of the colloidosomes to form multifunctional composite materials is more difficult.

According to a published text of a Chinese invention patent (CN104477990A), a method for preparing a nano zirconia colloid is disclosed. The nano zirconia colloid with the characteristics of high purity, high specific surface area and high dispersibility is prepared by the soft template method. However, due to a simple preparation process, a colloidosome cannot be formed, and properties of the colloid are not comparable to that of the colloidosome.

SUMMARY

The present invention provides a colloidosome with a variable pore size and a preparation method thereof.

The present invention is realized by specifically adopting the following technical means.

A method for preparing a colloidosome with a variable pore size is provided. The colloidosome is prepared by subjecting amphiphilic composite nanoparticles to water-oil two-phase emulsion and assembly at an interface to obtain a micelle, followed by crosslinking based on a template method, and the colloidosome has a diameter of 1-15 μm.

Pores of the colloidosome are generated by stacking the adjacent composite nanoparticles, and the pore size may be controlled by changing the concentration and/or number of the nanoparticles; and the colloidosome has a minimum pore size when the nanoparticles are stacked in the form of hexagonal close packing, and the pore with the minimum pore size has an area of $(0.03\text{-}0.05)\times d^2$ $nm^2$, where d refers to the diameter of the nanoparticles.

As a preference, the method includes the following steps:

(1) modification of nanoparticles: subjecting inorganic nanoparticles with a diameter or an equivalent diameter of 10-150 nm to surface modification by a silane ligand exchange method to enable surfaces of the inorganic nanoparticles modified with amino and/or carboxyl so as to form modified nanoparticles;

(2) synthesis of a polymer chain: performing cationic polymerization with a boron trifluoride-ether complex as an initiator in an ultra-dry dichloromethane solvent to prepare an active polymer chain solution;

(3) preparation of amphiphilic single-chain nanoparticles: dispersing the modified nanoparticles prepared in step (1) in ultra-dry dichloromethane to obtain a modified nanoparticle dispersion solution; slowly adding the active polymer chain solution prepared in step (2) into the modified nanoparticle dispersion solution under ultrasonic conditions, where the volume-mass ratio of the added active polymer chain solution to the modified nanoparticles is (0.9-1) mL:(0.9-1) mg; and performing ultrasonic treatment continuously to carry out a reaction for 0.8-1.5 h, then performing solid-liquid separation with a magnet, and washing a solid to obtain single-chain nanoparticles; and (4) preparation of a colloidosome with a variable pore size: placing 990-1,010 parts by weight of a water phase, 98-102 parts by weight of an oil phase and 0.8-1.2 parts by weight of the single-chain nanoparticles prepared in step (3) in a container, and performing emulsification to obtain a uniform oil-in-water emulsion; then adding glacial acetic acid to adjust the pH of the water phase to 4.8-5.2, and performing crosslinking with a glutaraldehyde aqueous solution, where the mass ratio of the added glutaraldehyde aqueous solution to the single-chain nanoparticles is (1.2-1.5):1; and after a dynamic Schiff base bond is formed in a reaction at room temperature for 4-6 h, performing reduction with sodium borohydride to obtain the colloidosome with a variable pore size, where the mass ratio of the added sodium borohydride to the glutaraldehyde aqueous solution is (0.5-1):1.

As a preference, in step (1), the inorganic nanoparticles are SiO₂ nanoparticles, the modified nanoparticles obtained in step (1) are specifically $SiO_2@NH_2$ nanoparticles, and step (1) specifically includes: treating the $SiO_2$ nanoparticles with amino silane for silane ligand exchange with glacial acetic acid as a catalyst in a non-polar solvent, where the volume ratio of the inorganic nanoparticles to the amino silane to the catalyst is 0.02% (m/v):0.5% (v/v):0.01% (v/v) in the non-polar solvent.

As a preference, the non-polar solvent is toluene or n-hexane; and the amino silane is 3-aminopropyltrimethoxysilane and/or 3-aminopropyltriethoxysilane.

As a preference, in step (2), the active polymer chain solution is an active hydrophobic polymer and specifically includes one or more of polystyrenes and polyolefins; a hydrodynamic diameter of the active hydrophobic polymer is equal to or greater than 80% of the diameter of the inorganic nanoparticles, and the active hydrophobic polymer has a weight-average molecular weight of $3.5\times10^1\text{-}3\times10^3$ kDa; and the ultrasonic conditions in step (3) include an ultrasonic frequency of 55-62 KHz (preferably 59 KHz) and an ultrasonic temperature of 23-28° C. (preferably 25° C.).

As a preference, the polystyrenes and the polyolefins include poly(p-methylstyrene) or polyisobutylene.

As a preference, in step (4), the water phase includes water, and the oil phase includes dichloromethane, toluene or sliced paraffin with a melting point of 52-54° C.

As a preference, in step (4), the uniform oil-in-water emulsion is obtained by using sliced paraffin as the oil phase, and the step specifically includes: placing the whole container in hot water to perform ultrasonic treatment at 60-70° C., stopping the ultrasonic treatment after the paraffin is completely melted, keeping the heating temperature at 60-70° C. continuously, and then subjecting a resulting mixture to high-speed shearing by using a high-speed shearing machine at a shearing rate of 10,000-15,000 rmp/min for 2-4 min to prepare the oil-in-water emulsion floating on an upper layer of the water phase.

As a preference, as an alternative, after the oil-in-water emulsion is obtained in step (4), the oil-in-water emulsion is subjected to standing and cooled to room temperature until being solidified to obtain a colloidosome with a variable pore size; and the obtained colloidosome with a variable pore size is immersed in n-hexane for 30-60 min and then taken out to obtain a colloidosome with a variable pore size that is a hollow sphere with dissolved paraffin, where the n-hexane is added in an amount to ensure that the colloidosome is completely immersed.

A colloidosome with a variable pore size is prepared by the preparation method; and a hydrophobic polymer chain in a cavity of the colloidosome with a variable pore size can have contraction and extension forms in different medium environments, such as water and/or oil, to block or expose pores, and can be applied to transmission in selective media.

The present invention has the following technical effects.

In the present invention, by setting the specific steps of modification of nanoparticles, synthesis of an active polymer chain, preparation of amphiphilic nanoparticles and preparation of a colloidosome with a variable pore size, the process of preparing a colloidosome with a variable pore size with inorganic nanoparticles as basic core raw materials is realized, reasonable process setting is realized, the prepared colloidosome with a variable pore size has a pore with a minimum cross-sectional area of about $0.04*d^2$ $nm^2$, a microcapsule has a reasonable structure, and the pore size and the structure of the microcapsule meet application requirements for transmission in media.

In the present invention, by reasonably setting various added materials in the process of preparing amphiphilic nanoparticles and reasonably setting various parameters in the process (for example, reasonably setting the ultrasonic frequency and addition conditions of various materials), the prepared composite nanoparticles are only grafted with a single polymer chain and have amphiphilic properties.

In the present invention, by reasonably setting various added materials in the process of preparing a colloidosome with a variable pore size and reasonably setting addition conditions, addition proportions and other parameters of the materials in the process, the pore size of the prepared colloidosome can be changed with changes of the concentration of the amphiphilic nanoparticles and reasonably controlled within a pore size range required by the present invention so as to meet requirements for transmission in media.

In the present invention, by specifically setting the step of preparing a colloidosome with a variable pore size based on single-chain nanoparticles and specific parameters (as shown in step 4 of the technical scheme of the present invention), a hydrophobic polymer chain in a cavity of the prepared colloidosome has contraction and extension forms in different medium environments, such as water and/or oil, to block or expose pores, and can be applied to transmission in selective media.

DETAINED DESCRIPTION OF THE EMBODIMENTS

To clarify the technical problems addressed, technical schemes, and the advantages of the present invention, a detailed description is provided below, accompanied by attached drawings and specific embodiments.

Example 1

Figure 1:
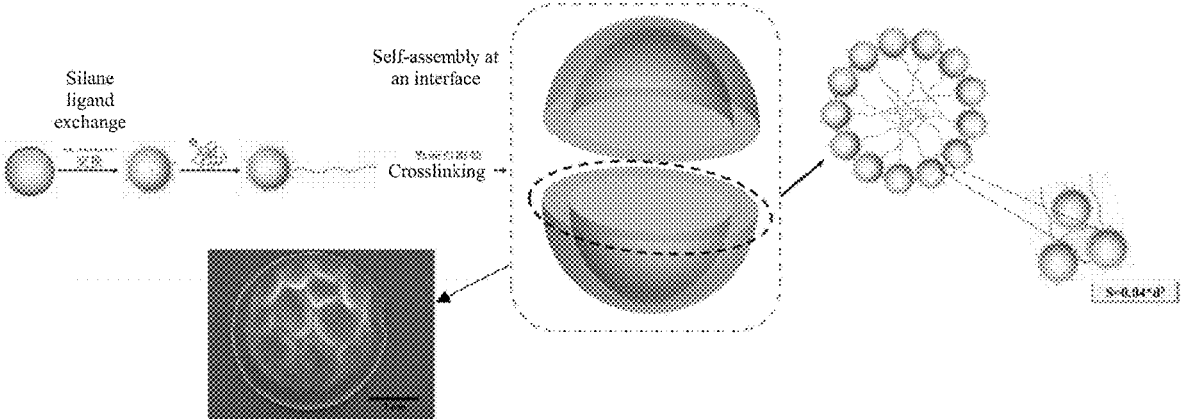
FIG. 1 is a schematic diagram of a preparation process of a colloidosome with a variable pore size described in the present invention.

The present example provides a silica colloidosome with a variable pore size of the present invention, where sliced paraffin is used as a template, and the colloidosome has a size of about 10 μm. A schematic diagram of a preparation process is shown in FIG. 1. A preparation method specifically includes the following steps.

(1) Synthesis of $SiO_2@NH_2$ Nanoparticles

An aqueous solution of $SiO_2$ nanoparticles with a diameter of 12 nm was freeze-dried for later use. 150 μL of 3-aminopropyltriethoxysilane and 3 μL of acetic acid were added into a toluene dispersion solution (30 mL) containing 6 mg of $SiO_2$ nanoparticles, and stirred to carry out a reaction at room temperature for 24 h. Then, a resulting solution was washed with toluene, centrifuged and separated at high speed, and freeze-dried for later use.

(2) Synthesis of a Poly(p-Methylstyrene) (PMS) Chain

20 μL of a boron trifluoride-ether complex was added into 10 mL of ultra-dry dichloromethane, and 3 mL of a p-methylstyrene monomer was added under magnetic stirring to carry out a reaction at room temperature for 30 min so as to synthesize a PMS polymer chain with a molecular weight of 40.9 kDa, where the size (hydrodynamic diameter) of the chain was equivalent to the diameter of the $SiO_2@NH_2$ particles.

(3) Preparation of $PMS-SiO_2@NH_2$ Amphiphilic Nanoparticles 10 mg of $SiO_2@NH_2$ was dispersed in 10 mL of ultra-dry dichloromethane. Under ultrasonic conditions, an active PMS chain solution obtained in step (3) was slowly added to carry out an ultrasonic reaction for 1 h. Then, a resulting solution was washed with dichloromethane, centrifuged, and precipitated to obtain a product, marked as $PMS-SiO_2@NH_2$ particles.

(4) Preparation of a Colloidosome with a Variable Pore Size 2 mg of the $PMS-SiO_2@NH_2$ particles obtained in step (3) were dispersed in 2 mL of water, 0.2 g of sliced paraffin (with a melting point of 52° C.) was added, a glass flask was placed in hot water for ultrasonic treatment at 70° C. until the paraffin was completely melted, and then a resulting solution was emulsified by a high-speed shearing emulsifier at a shearing rate of 10,000 rmp/min to obtain an emulsion floating on an upper layer of a water phase. Then, 0.2 mL of a glutaraldehyde aqueous solution was added into the emulsion, the pH of the water phase was adjusted to 5, and the mixed solution was reduced with sodium borohydride after a dynamic Schiff base bond was formed. Finally, the mixed solution was soaked in 5 mL of n-hexane for 30 min and then taken out to obtain a colloidosome with a variable pore size. The structure of the prepared colloidosome was characterized by a scanning electron microscope.

Figure 2:
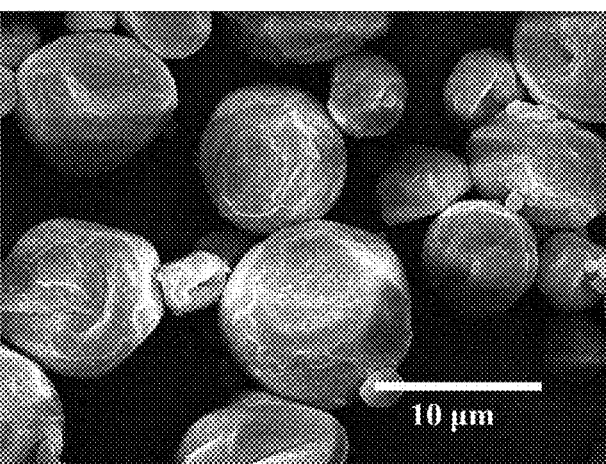
FIG. 2 is a scanning electron microscope (SEM) photograph of a colloidosome with a variable pore size prepared in Example 1 of the present invention.

The colloidosome is a sphere with a size of about 10 μm, as shown in FIG. 2.

Example 2

The present example provides a silica colloidosome with a variable pore size of the present invention, where an emulsion drop is used as a template, and the colloidosome has a size of about 1 μm. A preparation method specifically includes the following steps.

(1) Synthesis of $SiO_2$@$NH_2$ Nanoparticles (Modification of Nanoparticles)

An aqueous solution of $SiO_2$ nanoparticles with a diameter of 12 nm was freeze-dried for later use. 150 μL of 3-aminopropyltriethoxysilane and 3 μL of acetic acid were added into a toluene dispersion solution (30 mL) containing 6 mg of $SiO_2$ nanoparticles, and stirred to carry out a reaction at room temperature for 24 h. Then, a resulting solution was washed with toluene, centrifuged and separated at high speed, and freeze-dried for later use.

(2) Synthesis of a Poly(p-Methylstyrene) (PMS) Chain (Synthesis of a Polymer Chain)

20 μL of a boron trifluoride-ether complex was added into 10 mL of ultra-dry dichloromethane, and 3 mL of a p-methylstyrene monomer was added under magnetic stirring to carry out a reaction at room temperature for 30 min so as to synthesize a PMS polymer chain with a molecular weight of 40.9 kDa, where the size (hydrodynamic diameter) of the chain was equivalent to the diameter of the $SiO_2$@$NH_2$ particles.

(3) Preparation of PMS-$SiO_2$@$NH_2$ Amphiphilic Nanoparticles (Preparation of Amphiphilic Single-Chain Nanoparticles)

10 mg of $SiO_2$@$NH_2$ was dispersed in 10 mL of ultra-dry dichloromethane. Under ultrasonic conditions, an active PMS chain solution obtained in step (3) was slowly added to carry out an ultrasonic reaction for 1 h. Then, a resulting solution was washed with dichloromethane, centrifuged, and precipitated to obtain a product, marked as PMS-$SiO_2$@$NH_2$ particles.

Figure 3:
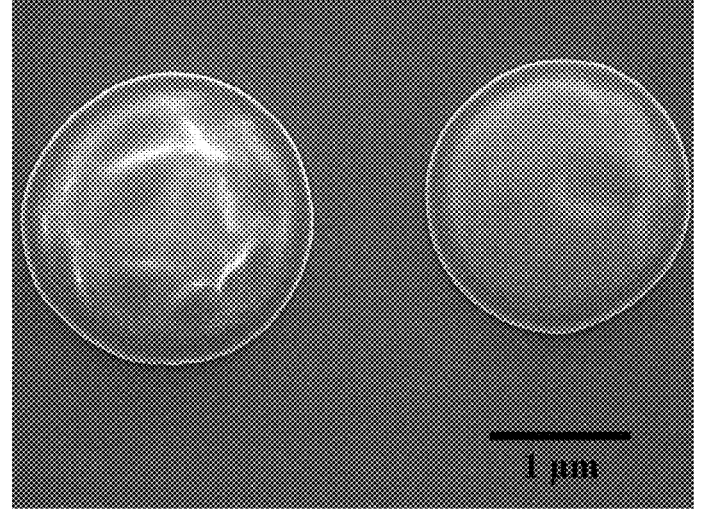
FIG. 3 is an SEM photograph of a colloidosome with a variable pore size prepared in Example 2 of the present invention.
Figure 4:
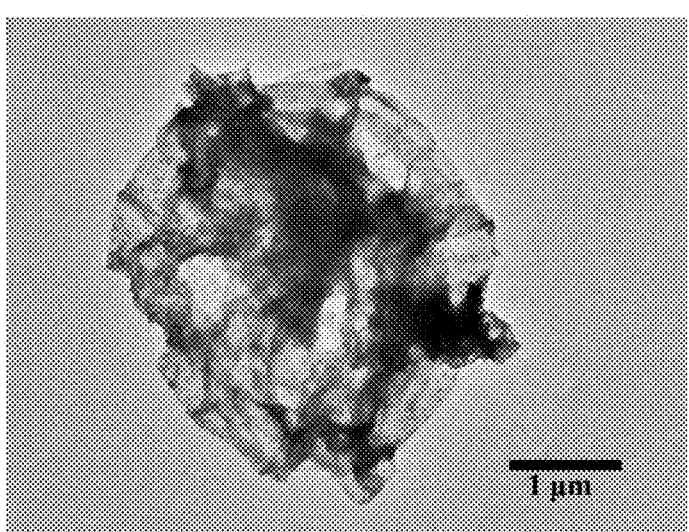
FIG. 4 is a transmission electron microscope (TEM) photograph of the colloidosome with a variable pore size prepared in Example 2 of the present invention.

(4) Preparation of a Colloidosome with a Variable Pore Size 2 mg of the PMS-$SiO_2$@$NH_2$ particles obtained in step (3) were dispersed in 2 mL of water, 0.2 mL of toluene was added, and then a resulting solution was emulsified to obtain an emulsion. Then, 0.2 mL of a glutaraldehyde aqueous solution was added into the emulsion, the pH of a water phase was adjusted to 5, and the mixed solution was reduced with sodium borohydride after a dynamic Schiff base bond was formed, so as to obtain a colloidosome with a variable pore size. The structure of the prepared colloidosome was characterized by a scanning electron microscope and a transmission electron microscope. The colloidosome is a sphere with a size of about 1 μm, as shown in FIG. 3 and FIG. 4.

Example 3

The present example provides a magnetic responsive colloidosome with a variable pore size of the present invention, where an emulsion drop is used as a soft template, and the colloidosome has a size of about 2 μm. A preparation method specifically includes the following steps.

(1) Synthesis of $Fe_3O_4$ Nanoparticles 100 mL of a sodium oleate aqueous solution (0.2 M) and 100 mL of an anhydrous ferric chloride aqueous solution (0.2 M) were mixed and thoroughly stirred to produce a reddish-brown precipitate, and a mixed solution was filtered, rinsed with deionized water, and then dried in a vacuum oven. A dried waxy compound was dissolved in 60 mL of ethanol, uniformly mixed with 6 mL of oleic acid, and then transferred to a polytetrafluoroethylene high-pressure reactor to carry out a reaction at 180° C. for 5 h. A resulting mixture was washed with anhydrous ethanol, separated with a magnet, and dispersed in toluene for later use to obtain nanoparticles with a size of about 10 nm.

(2) Synthesis of $Fe_3O_4$@$NH_2$ Nanoparticles (Modification of Nanoparticles)

0.5% (v/v) of 3-aminopropyltriethoxysilane and 0.01% (v/v) of acetic acid were added into a toluene dispersion solution (30 mL) containing 6 mg of $Fe_3O_4$ nanoparticles, and stirred to carry out a reaction at room temperature for 24 h. Then, a resulting solution was washed with toluene, separated with a magnet, and freeze-dried for later use.

(3) Synthesis of a Polyisobutylene (PIB) Chain (Synthesis of a Polymer Chain)

20 μL of a boron trifluoride-ether complex was added into 5 mL of ultra-dry dichloromethane, and 2 mL of an isobutylene monomer was added under magnetic stirring to carry out a reaction at room temperature for 30 min so as to synthesize a polyisobutylene polymer chain with a molecular weight of 34.3 kDa, where the size (hydrodynamic diameter) of the chain was equivalent to the diameter of the $Fe_3O_4$@$NH_2$ particles.

(4) Preparation of PIB—$Fe_3O_4$@$NH_2$ Amphiphilic Nanoparticles (Preparation of Amphiphilic Single-Chain Nanoparticles)

10 mg of $Fe_3O_4$@$NH_2$ was dispersed in 10 mL of ultra-dry dichloromethane. Under ultrasonic conditions, an active PIB chain solution obtained in step (3) was slowly added to carry out an ultrasonic reaction for 1 h. Then, a resulting solution was washed with dichloromethane and collected with a magnet to obtain a product, marked as PIB—$Fe_3O_4$@$NH_2$ particles.

(5) Preparation of a Magnetic Responsive Colloidosome with a Variable Pore Size 2 mg of the PIB—$Fe_3O_4$@$NH_2$ particles obtained in step (4) were dissolved in 2 mL of water, and 0.2 mL of toluene was added to carry out ultrasonic treatment for 1 min so as to obtain a uniform emulsion, where the emulsion has a size of about 2 μm under a laser confocal microscope. Then, 0.2 mL of a glutaraldehyde aqueous solution was added into the obtained emulsion, the pH of a water phase was adjusted to 5, and the mixed solution was reduced with sodium borohydride after a dynamic Schiff base bond was formed, so as to obtain a magnetic responsive colloidosome with a variable pore size. The structure of the prepared colloidosome was characterized by a scanning electron microscope and a transmission electron microscope. The colloidosome is a hollow sphere with a size of about 2 μm.

Technologies well-known in the field to which the present invention relates are not described in detail. The descriptions above are only preferred embodiments of the present invention, and are not intended to limit the present invention. Any modifications, equivalent substitutions, improvements and the like made within the spirit and principles of the present invention shall be included in the scope of protection of the present invention.

What is claimed is:

1. A method for preparing a colloidosome with a variable pore size, wherein the colloidosome is prepared by subjecting amphiphilic composite nanoparticles to water-oil two-phase emulsion and assembly at an interface to obtain a micelle, followed by crosslinking based on a template method, and wherein the colloidosome has a diameter of 1-15 μm;

pores of the colloidosome are generated by stacking adjacent amphiphilic composite nanoparticles, and the variable pore size is controlled by changing a concentration and/or a number of the adjacent amphiphilic composite nanoparticles, wherein the colloidosome has a minimum pore size when the adjacent amphiphilic composite nanoparticles are stacked in a form of hexagonal close packing, wherein the pore with the minimum pore size has an area of $(0.03-0.05) \times d^2$ $nm^2$, and wherein d refers to a diameter of each of the amphiphilic composite nanoparticles; and wherein the method for preparing the colloidosome with the variable pore size comprises the following steps:

(1) modification of the amphiphilic composite nanoparticles: subjecting inorganic nanoparticles with a diameter or an equivalent diameter of 10-150 nm to surface modification by a silane ligand exchange method to enable surfaces of the inorganic nanoparticles modified with amino and/or carboxyl so as to form modified nanoparticles;

(2) synthesis of a polymer chain: performing cationic polymerization with a boron trifluoride-ether complex as an initiator in an ultra-dry dichloromethane solvent to prepare an active polymer chain solution;

(3) preparation of amphiphilic single-chain nanoparticles: dispersing the modified nanoparticles prepared in step (1) in ultra-dry dichloromethane to obtain a modified nanoparticle dispersion solution; slowly adding the active polymer chain solution prepared in step (2) into the modified nanoparticle dispersion solution under ultrasonic conditions, wherein a volume-mass ratio (mL of the active polymer chain solution:mg of the modified nanoparticles) is from 0.9:0.9 to 1.0:1.0; and performing ultrasonic treatment continuously to carry out a reaction for 0.8-1.5 h, then performing solid-liquid separation with a magnet, and washing a solid to obtain single-chain nanoparticles; and (4) preparation of the colloidosome with the variable pore size: placing 990-1,010 parts by weight of a water phase, 98-102 parts by weight of an oil phase and 0.8-1.2 parts by weight of the single-chain nanoparticles prepared in step (3) in a container, and performing emulsification to obtain a uniform oil-in-water emulsion; then adding glacial acetic acid to adjust a pH of the water phase to 4.8-5.2, and performing crosslinking with a glutaraldehyde aqueous solution, wherein a mass ratio of the glutaraldehyde aqueous solution to the single-chain nanoparticles is (1.2-1.5):1; and after a dynamic Schiff base bond is formed in a reaction at room temperature for 4-6 h, performing reduction with sodium borohydride to obtain the colloidosome with the variable pore size, wherein a mass ratio of the sodium borohydride to the glutaraldehyde aqueous solution is (0.5-1):1.

2. The method for preparing the colloidosome with the variable pore size according to claim 1, wherein in step (1), the inorganic nanoparticles are $SiO_2$ nanoparticles, the modified nanoparticles obtained in step (1) are $SiO_2@NH_2$ nanoparticles, and step (1) comprises: treating the $SiO_2$ nanoparticles with amino silane for silane ligand exchange with the glacial acetic acid as a catalyst in a non-polar solvent, wherein a volume ratio of the inorganic nanoparticles to the amino silane to the catalyst is 0.02% (m/v): 0.5% (v/v): 0.01% (v/v) in the non-polar solvent.

3. The method for preparing the colloidosome with the variable pore size according to claim 2, wherein the non-polar solvent is toluene or n-hexane; and the amino silane is 3-aminopropyltrimethoxysilane and/or 3-aminopropyltriethoxysilane.

4. The method for preparing the colloidosome with the variable pore size according to claim 1, wherein in step (2), the active polymer chain solution is an active hydrophobic polymer and comprises one or more of polystyrenes and polyolefins; a hydrodynamic diameter of the active hydrophobic polymer is equal to or greater than 80% of a diameter of the inorganic nanoparticles, and the active hydrophobic polymer has a weight-average molecular weight of $3.5 \times 10^1$-$3 \times 10^3$ kDa; and the ultrasonic conditions in step (3) comprise an ultrasonic frequency of 55-62 KHz and an ultrasonic temperature of 23-28° C.

5. The method for preparing the colloidosome with the variable pore size according to claim 4, wherein the polystyrenes and the polyolefins comprise poly(p-methylstyrene) or polyisobutylene.

6. The method for preparing the colloidosome with the variable pore size according to claim 1, wherein in step (4), the water phase comprises water, and the oil phase comprises dichloromethane, toluene or sliced paraffin with a melting point of 52-54° C.

7. The method for preparing the colloidosome with the variable pore size according to claim 1, wherein in step (4), the uniform oil-in-water emulsion is obtained by using sliced paraffin as the oil phase, and the step comprises: placing the container in hot water to perform ultrasonic treatment at 60-70° C., stopping the ultrasonic treatment after the sliced paraffin is completely melted, keeping a heating temperature at 60-70° C. continuously, and then subjecting a resulting mixture to high-speed shearing by using a high-speed shearing machine at a shearing rate of 10,000-15,000 rmp/min for 2-4 min to prepare the uniform oil-in-water emulsion floating on an upper layer of the water phase.

8. The method for preparing the colloidosome with the variable pore size according to claim 7, wherein after the uniform oil-in-water emulsion is obtained in step (4), the uniform oil-in-water emulsion is subjected to standing and cooled to room temperature until being solidified to obtain a cooled colloidosome with the variable pore size; and the cooled colloidosome with the variable pore size is immersed in n-hexane for 30-60 min and then taken out to obtain the colloidosome with the variable pore size, wherein the colloidosome with the variable pore size is a hollow sphere with dissolved paraffin, and wherein the n-hexane is added in an amount to ensure the cooled colloidosome to be completely immersed.

9. A colloidosome with a variable pore size, wherein the colloidosome is prepared by the method according to claim 1; and a hydrophobic polymer chain in a cavity of the colloidosome with the variable pore size has contraction and extension forms in different medium environments, wherein the medium environments comprise water and/or oil, wherein the hydrophobic polymer chain is configured to block or expose pores, and wherein the colloidosome is applied to transmission in selective media.

10. The colloidosome with the variable pore size according to claim 9, wherein in step (1) of the method for preparing the colloidosome, the inorganic nanoparticles are $SiO_2$ nanoparticles, the modified nanoparticles obtained in step (1) are $SiO_2@NH_2$ nanoparticles, and step (1) comprises: treating the $SiO_2$ nanoparticles with amino silane for silane ligand exchange with the glacial acetic acid as a catalyst in a non-polar solvent, wherein a volume ratio of the inorganic nanoparticles to the amino silane to the catalyst is 0.02% (m/v):0.5% (v/v):0.01% (v/v) in the non-polar solvent.

11. The colloidosome with the variable pore size according to claim 10, wherein the non-polar solvent is toluene or n-hexane; and the amino silane is 3-aminopropyltrimethoxysilane and/or 3-aminopropyltriethoxysilane.

12. The colloidosome with the variable pore size according to claim 9, wherein in step (2) of the method for preparing the colloidosome, the active polymer chain solution is an active hydrophobic polymer and comprises one or more of polystyrenes and polyolefins; a hydrodynamic diameter of the active hydrophobic polymer is equal to or greater than 80% of a diameter of the inorganic nanoparticles, and the active hydrophobic polymer has a weight-average molecular weight of $3.5\times10^1$-$3\times10^3$ kDa; and the ultrasonic conditions in step (3) comprise an ultrasonic frequency of 55-62 KHz and an ultrasonic temperature of 23-28° C.

13. The colloidosome with the variable pore size according to claim 12, wherein the polystyrenes and the polyolefins comprise poly(p-methylstyrene) or polyisobutylene.

14. The colloidosome with the variable pore size according to claim 9, wherein in step (4) of the method for preparing the colloidosome, the water phase comprises water, and the oil phase comprises dichloromethane, toluene or sliced paraffin with a melting point of 52-54° C.

15. The colloidosome with the variable pore size according to claim 9, wherein in step (4) of the method for preparing the colloidosome, the uniform oil-in-water emulsion is obtained by using sliced paraffin as the oil phase, and the step comprises: placing the container in hot water to perform ultrasonic treatment at 60-70° C., stopping the ultrasonic treatment after the sliced paraffin is completely melted, keeping a heating temperature at 60-70° C. continuously, and then subjecting a resulting mixture to high-speed shearing by using a high-speed shearing machine at a shearing rate of 10,000-15,000 rmp/min for 2-4 min to prepare the uniform oil-in-water emulsion floating on an upper layer of the water phase.

16. The colloidosome with the variable pore size according to claim 15, wherein after the uniform oil-in-water emulsion is obtained in step (4), the uniform oil-in-water emulsion is subjected to standing and cooled to room temperature until being solidified to obtain a cooled colloidosome with the variable pore size; and the cooled colloidosome with the variable pore size is immersed in n-hexane for 30-60 min and then taken out to obtain the colloidosome with the variable pore size, wherein the colloidosome with the variable pore size is a hollow sphere with dissolved paraffin, and wherein the n-hexane is added in an amount to ensure the cooled colloidosome to be completely immersed.

\* \* \* \* \*